(12) United States Patent
Pietraszkiewicz et al.

(10) Patent No.: US 7,534,085 B2
(45) Date of Patent: May 19, 2009

(54) GAS TURBINE ENGINE WITH CONTOURED AIR SUPPLY SLOT IN TURBINE ROTOR

(75) Inventors: Edward F. Pietraszkiewicz, Southington, CT (US); James P. Downs, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 359 days.

(21) Appl. No.: 11/472,104

(22) Filed: Jun. 21, 2006

(65) Prior Publication Data
US 2007/0297918 A1    Dec. 27, 2007

(51) Int. Cl.
*F01D 5/08* (2006.01)
(52) U.S. Cl. .................................... 415/115; 416/219 R
(58) Field of Classification Search ................. 415/115; 416/96 R, 219 R
See application file for complete search history.

(56) References Cited

U.S. PATENT DOCUMENTS

| 5,630,703 A * | 5/1997 | Hendley et al. ............... 416/95 |
| 6,786,696 B2 * | 9/2004 | Herman et al. ............ 416/96 R |
| 2005/0201857 A1 * | 9/2005 | Ferra et al. .................. 415/115 |

* cited by examiner

*Primary Examiner*—Ninh H Nguyen
(74) *Attorney, Agent, or Firm*—Carlson, Gaskey & Olds

(57) ABSTRACT

A gas turbine engine is provided with a turbine rotor disk having a plurality of disk slots which each receive a turbine blade. Cooling air is delivered into the disk slots, and flows into cooling air passages at a radially inner surface of the turbine blades. As known, the cooling air flows through the turbine blades to cool internal and external surfaces of the turbine blade. The disk slots are formed to have a greater cross-sectional area adjacent at the inlet end than at downstream locations. In this manner, the velocity of the air at the inlet end is reduced compared to the prior art, and pressure losses are minimized compared to the prior art.

12 Claims, 5 Drawing Sheets

US 7,534,085 B2

GAS TURBINE ENGINE WITH CONTOURED AIR SUPPLY SLOT IN TURBINE ROTOR

BACKGROUND OF THE INVENTION

Disk slots for supplying cooling air into turbine blades have an enlarged cross-sectional flow area adjacent an inlet end, and a reduced cross-sectional flow area at downstream locations. In this manner, pressure losses associated with the inlet end of the disk slot are reduced.

Gas turbine engines are known, and operate to supply propulsion for various applications. In a typical gas turbine engine, a fan section delivers air to a compressor section. Air is compressed in the compressor section, and mixed with fuel in a combustor section. Products of combustion are directed downstream over turbine blades, and drive turbine blades and associated rotors to rotate.

One challenge facing the turbine section, is that the blades are subject to very hot temperatures. Thus, cooling air is typically supplied to passages within the blades, and may be directed outwardly of openings in the blades and into the combustion flow stream. To drive the cooling air through the blade and into the combustion air stream, the cooling air must be at a relatively high pressure. In particular, the pressure of this cooling air must exceed the pressure of the hot gas flowing around the contour of the turbine blade.

Typically, the turbine section includes a plurality of rotors each having a plurality of disk slots at spaced circumferential locations. The rotors may be provided with disk lugs, or a plurality of ears. The turbine blades are inserted into these slots, with mating structure received between the disk lugs. The disk slot includes a cooling air supply space radially inwardly of a radially innermost end of the turbine blade. Openings in a radial bottom of the turbine blade communicate with cooling air in the disk slot. Air flows from the compressor section, around the combustor section, into the disk slots, and upwardly into these blade openings to be delivered to the turbine blades.

The size of the disk slots has been limited in practice. In particular, structural considerations must be taken into account, as the disk lugs must support the turbine blades, and thus are subject to stresses and applied centrifugal forces. The bottom of the disk slot forms what is known as a disk live rim. This area carries what are known as disk hoop loads, and is an important consideration in the disk structural design.

For cooling requirements alone, it might be desirable to make the disk slot as large as possible to reduce the flow velocity of the air, thereby minimizing pressure losses of the cooling air delivered to the turbine blade. However, the structural considerations mentioned above limit the size of the disk slot.

The pressure losses are highest at the inlet of the slot. This is due to what is known as an "entrance effect" coupled with the fact that all of the cooling air must pass through this region, creating a highest flow velocity along the slot. The pressure losses tend to decrease along the length of the slot as the passage friction tends to be a smaller loss driver than the entrance effect. Also, the flow velocity is reduced as cooling air is bled off into successive passages in the turbine blades.

In the prior art, while there have been curved air flow slots, in general, the cross-sectional area has been relatively constant along a flow length.

In sum, it would be desirable to reduce pressure losses within the disk slot, and in particular at the inlet portion of the disk slot.

SUMMARY OF THE INVENTION

In a disclosed embodiment of this invention, a disk slot through a turbine rotor has a greater cross-sectional area adjacent an inlet end than it does at a downstream location. In this manner, the velocity at the inlet end may be reduced relative to its prior art higher velocity. This reduces pressure losses, and can address the "entrance effect" mentioned above. At the same time, the cross-sectional area is maintained smaller further downstream in the slot, such that the structural considerations mentioned above may still be considered and addressed.

In one embodiment, a radial depth of the slot is greatest at the entrance end, and curves upwardly toward a smaller depth adjacent an exit end.

In another embodiment, a circumferential width of the disk slot decreases moving downstream, with the greatest width adjacent the inlet end, and steadily decreasing widths moving towards the exit end.

In yet another embodiment, the slot is formed of a plurality of scalloped surfaces. Further, the very entrance is scalloped to be open, and to eliminate any sharp flow restriction at the entrance end.

These and other features of the present invention can be best understood from the following specification and drawings, the following of which is a brief description.

DETAILED DESCRIPTION OF THE PREFERRED EMBODIMENT

Figure 1:
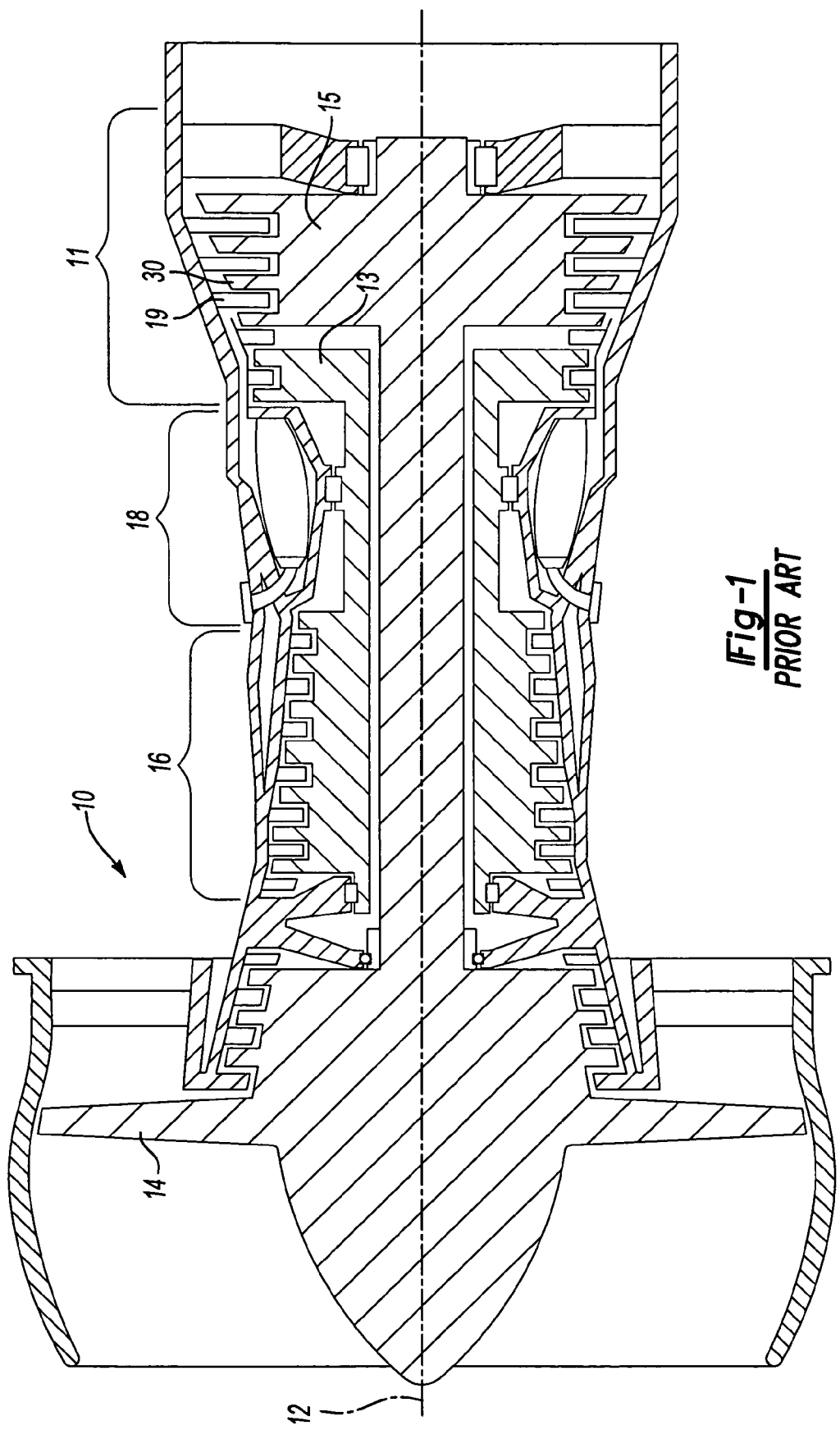
FIG. 1 is a cross-sectional view of a prior art gas turbine engine.

FIG. 1 shows a gas turbine engine 10, such as a gas turbine used for power generation or propulsion, circumferentially disposed about an engine centerline, or axial centerline axis 12. The engine 10 includes a fan 14, a compressor 16, a combustion section 18 and a turbine 11. As is well known in the art, air compressed in the compressor 16 is mixed with fuel which is burned in the combustion section 18 and expanded in turbine 11. The air compressed in the compressor and the fuel mixture expanded in the turbine 11 can both be referred to as a hot gas stream flow. The turbine 11 includes rotors 13 and 15 that, in response to the expansion, rotate, driving the compressor 16 and fan 14. The turbine 11 comprises alternating rows of rotary blades 30 and static airfoils or vanes 19. The blades 30 are removably mounted in the rotors, as will be explained below. FIG. 1 is a somewhat schematic representation, for illustrative purposes only, and is not a limitation of the instant invention, that may be employed on gas turbines used for electrical power generation and aircraft.

Figure 2:
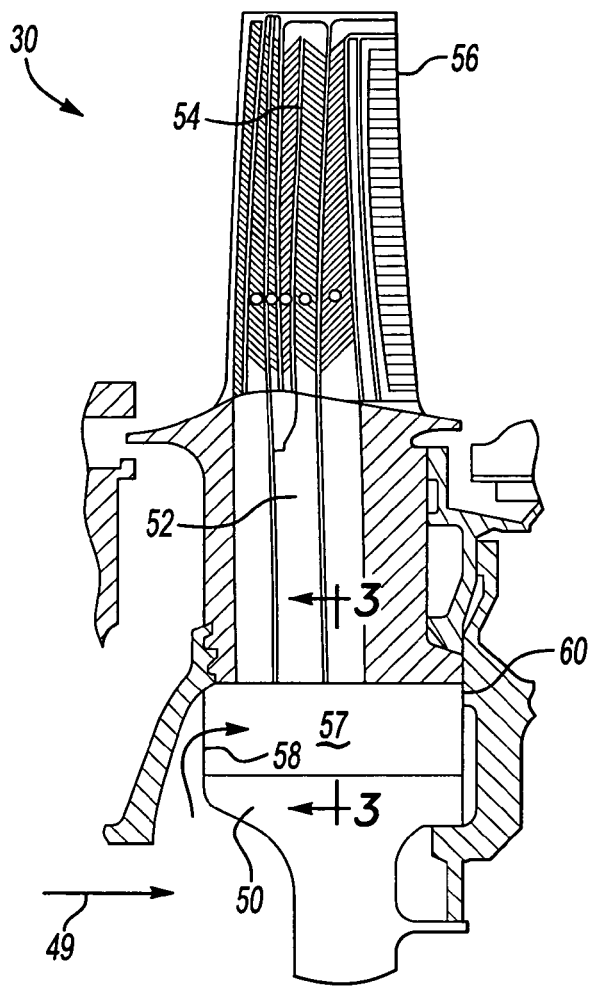
FIG. 2 is a cross-sectional view through a portion of a prior art turbine section.

FIG. 2 shows a turbine blade 30 received in a turbine rotor disk 50. As shown, cooling passages 52 extend through a platform of the blade 30 and upwardly to cooling passages 54 and openings 56. As known, a cooling air supply flows upwardly through the blade passages 52, 54 and then outwardly of openings 56 to cool the blade both internally and externally.

A disk slot 57 is formed within the rotor 50. Air from a cooling air supply 49 is delivered into the slot 57, and then upwardly into passages 52. As can be appreciated, the disk slot 57 has an inlet end 58 and an exit end 60. As mentioned above, this prior art experiences undesirable pressure losses as the air flows along the length of the slot. In particular, those pressure losses are greatest at the inlet end 58.

Figure 3:
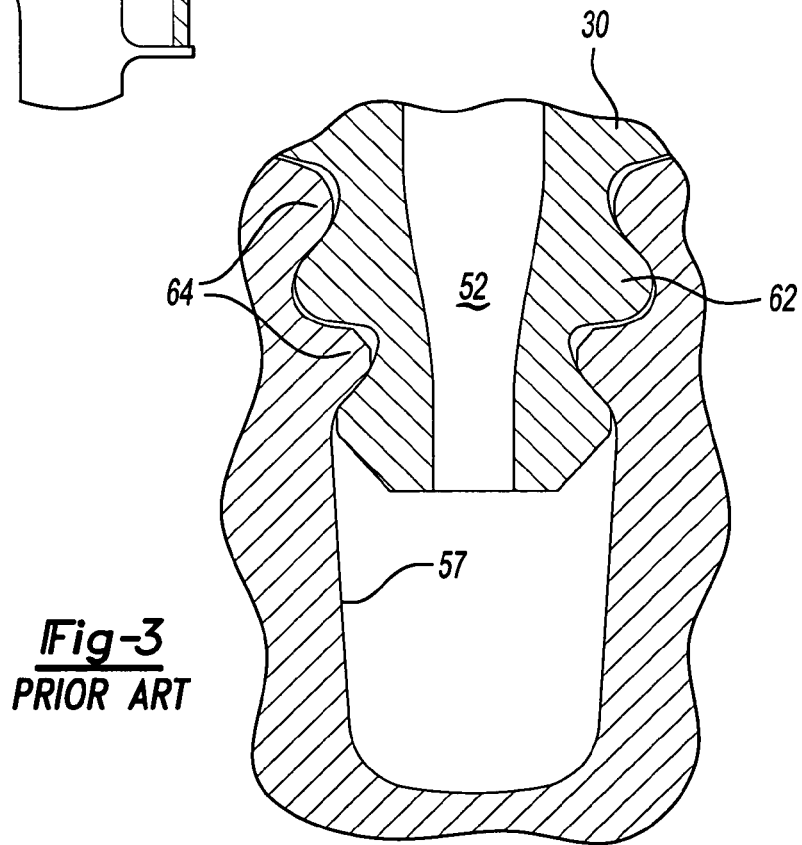
FIG. 3 is a cross-sectional view along line 3-3 as shown in FIG. 2.

FIG. 3 shows another feature of the disk slot 57. As shown, a bottom surface of the platform of the blade 30 includes a plurality of ears 62 which are received between disk lugs 64 in the disk slot 57. These structural interconnections place stresses and forces on the interface between the blade and the disk slot, and place limitations on the design of the disk slot as mentioned above.

Figure 4:
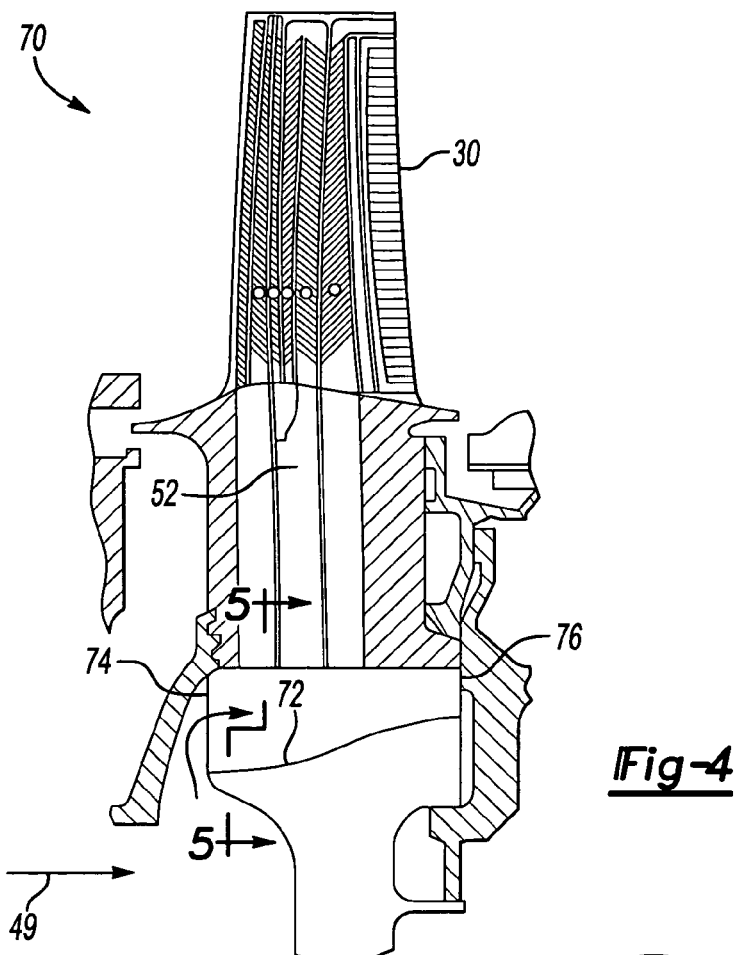
FIG. 4 shows a first embodiment of the present invention.

FIG. 4 shows a first embodiment 70 of the present invention. As shown, the disk slot 72 has a greater depth at the inlet end 74 than it does at the exit end 76. In this manner, the velocity at the inlet end 74 can be reduced, and thus the pressure losses at the inlet end can also be reduced.

Figure 5:
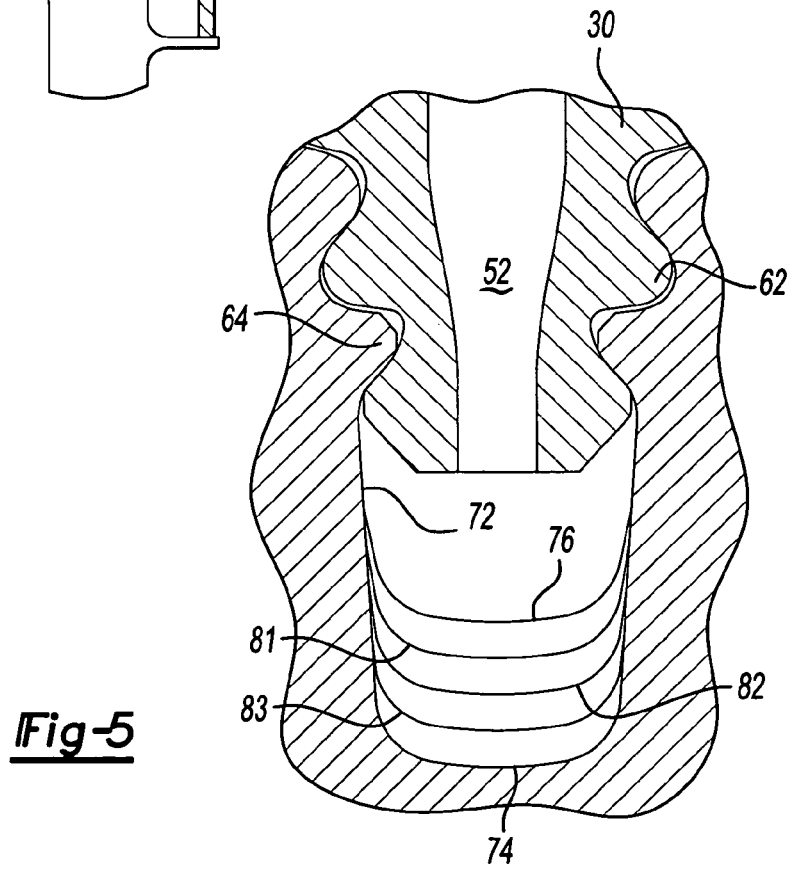
FIG. 5 is a cross-sectional view along line 5-5 as shown in FIG. 4.

As shown in FIG. 5, there can be a plurality of distinct depths moving downstream from inlet end 74 toward exit end 76. As shown, three intermediate positions 81, 82 and 83 are illustrated to show a generally curved contour along the depth of the disk slot 72. The velocity at the inlet end 74 is reduced and yet the disk slot can still provide the structural integrity that it is necessary due to the relatively smaller sizes at the downstream locations.

Figure 6:
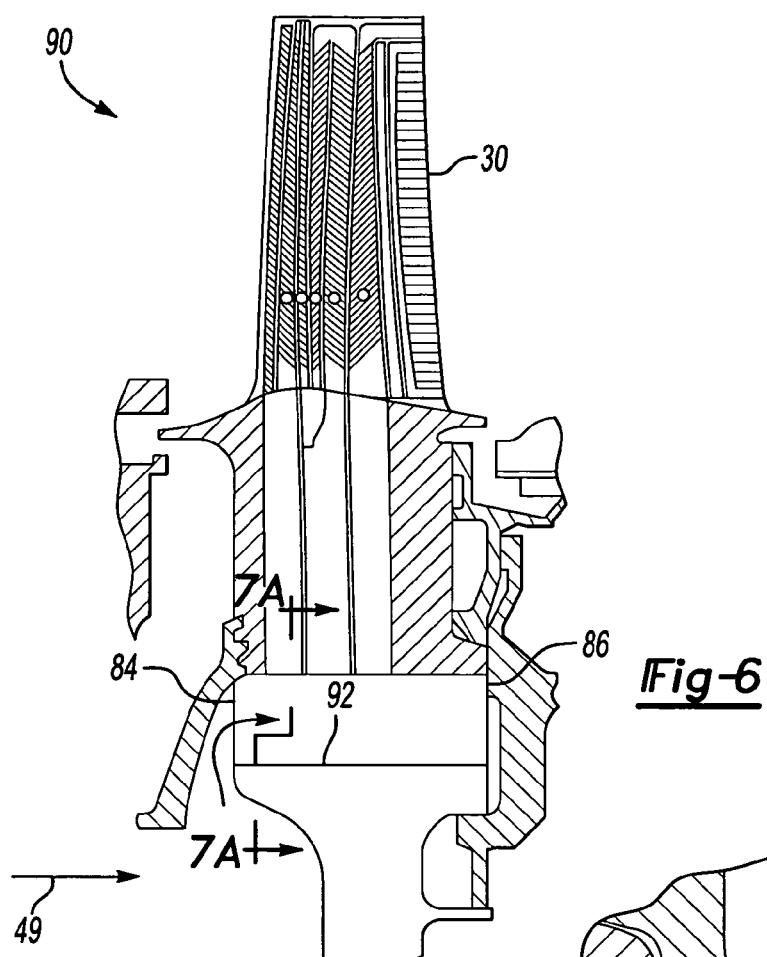
FIG. 6 shows another embodiment of the present invention.

FIG. 6 shows yet another embodiment 90, wherein the disk slot 92 extends from the inlet end 84 to the exit end 86. As can be appreciated from FIG. 6, the depth can be relatively constant.

Figure 7B:
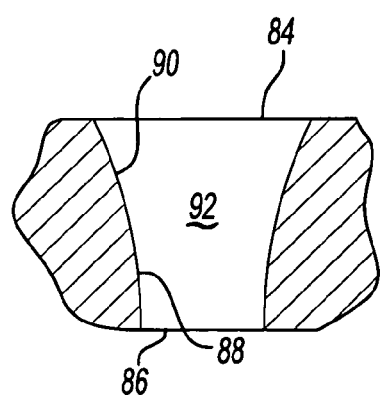
FIG. 7B is a plan view of the FIG. 7A embodiment.
Figure 7A:
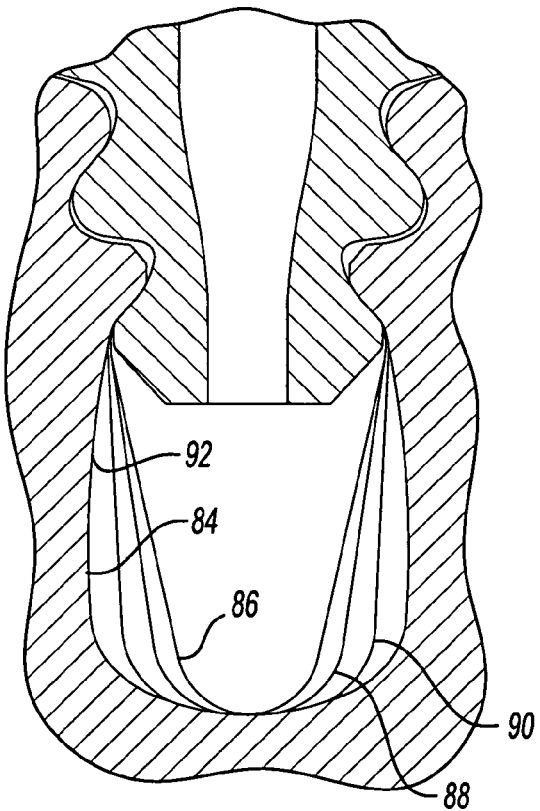
FIG. 7A is a cross-sectional view along line 7A-7A of FIG. 6.

However, as shown in FIG. 7A, the width of the slot 92 decreases from the inlet end 84 toward the exit end 86. As shown here, two intermediate positions 88 and 90 are illustrated between the inlet end 84 and the exit end 86. As can be appreciated from FIG. 7B, the entire surface of the disk slot 92 curves between the inlet end 84 and the exit end 86.

Figure 8:
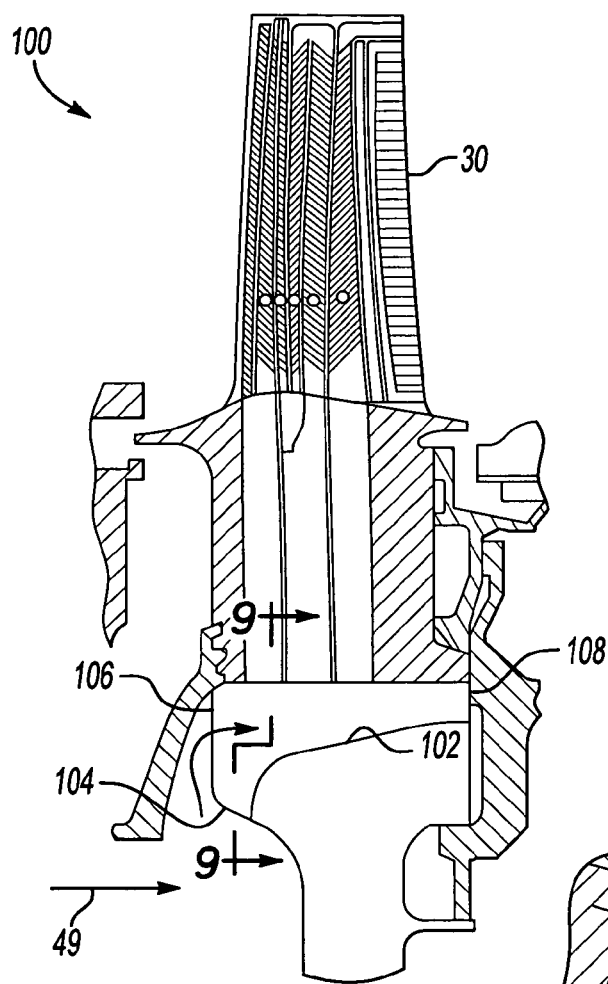
FIG. 8 shows yet another embodiment of the present invention.
Figure 9:
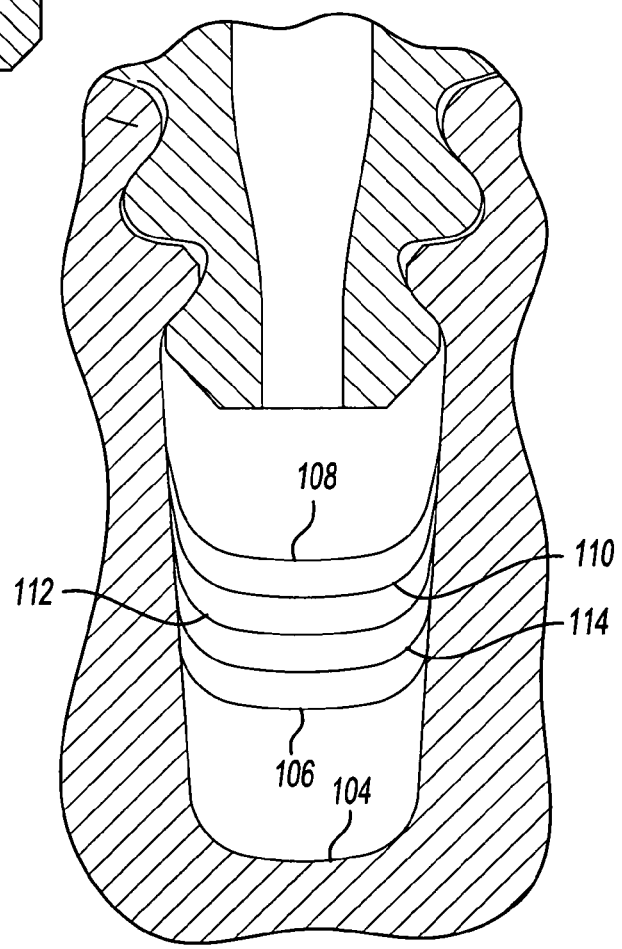
FIG. 9 is a cross-sectional view along line 9-9 as shown in FIG. 8.

FIG. 8 shows yet another embodiment 100. In embodiment 100, the disk slot 102 may curve upwardly to shallower depths moving from the inlet end 104 toward the exit end 108. Intermediate positions 110, 112 and 114 also are curved or scalloped away to have a somewhat smaller width. Further, a portion 104 adjacent the forward most end of the disk slot may be carved open to prevent any flow restriction at the inlet end, and to serve and to guide the cooling air from passage 49 upwardly toward the slot 102.

While a single blade and disk slot are illustrated, it is well known that a plurality of circumferentially spaced disk slots and associated blades are positioned in each turbine rotor.

Moreover, while the contour of the various disk slots disclosed in this application curve smoothly, and generally change constantly, neither of these features is limiting on this invention. That is, the cross-sectional area may change in any other manner, including non-curved step changes.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine comprising:
   a fan section, a compressor section, a combustor section and a turbine section spaced along an axis;
   said turbine section including at least one rotor disk including a plurality of disk slots, a plurality of turbine blades, each received within a corresponding one of said plurality of disk slots, and a cooling air supply for supplying cooling air along an axial length of said gas turbine engine and into said disk slots, said cooling air entering said disk slots at a position radially inwardly of a radial inner end of said turbine blades, and said turbine blades having air supply openings for receiving the cooling air delivered into said disk slots, and delivering said air radially outwardly along a length of said turbine blades; and
   cooling air flowing through said disk slot from an inlet end toward an exit end, and a first cross-sectional area of said disk slot adjacent said inlet end being greater than a second cross-sectional area at a location downstream of said inlet end, and the difference in cross-sectional area of said disk slot adjacent said inlet end and the location downstream of said inlet end being achieved by changing a contour of said disk slot.

2. The gas turbine engine as set forth in claim 1, wherein at least one surface of said disk slots is curved between said inlet end and said exit end to reduce the cross-sectional area between said inlet and said exit end.

3. The gas turbine engine as set forth in claim 1, wherein a radial depth of said disk slot adjacent said inlet end is greater than a radial depth downstream of said inlet end.

4. The gas turbine engine as set forth in claim 1, wherein a circumferential width of said disk slot adjacent said inlet end is greater than a circumferential width downstream of said inlet end.

5. The gas turbine engine as set forth in claim 1, wherein cross-sectional areas of said disk slots are scalloped between said inlet end and moving downstream toward said outlet end such that downstream locations are smaller both in a radial depth and in a circumferential width.

6. The gas turbine engine as set forth in claim 1, wherein an inlet face of said disk slot is scalloped away to provide a smooth flow passage for air traveling into said disk slots.

7. A turbine rotor comprising:
   at least one rotor disk including a plurality of disk slots, a plurality of turbine blades each received within a corresponding one of said plurality of disk slots, and a cooling air passage for supplying cooling air along a length of said disk rotor and into said disk slots, the cooling air passage entering said disk slots at a position radially inwardly of a radial inner end of said turbine blades, and said turbine blades having air supply openings for receiving cooling air delivered into said disk slots, and delivering air radially outwardly along a length of said turbine blades; and
   cooling air flow through said disk slot from an inlet end toward an exit end, and a first cross-sectional area of said disk slot adjacent said inlet end being greater than a second cross-sectional area at a location downstream of said inlet end, and the difference in cross-sectional area of said disk slot adjacent said inlet end and the location downstream of said inlet end being achieved by changing a contour of said disk slot.

8. The turbine rotor as set forth in claim 7, wherein at least one surface of said disk slots is curved between said inlet end and said exit end to reduce the cross-sectional area between said inlet and said exit end.

9. The turbine rotor as set forth in claim 7, wherein a radial depth of said disk slot adjacent said inlet end is greater than a radial depth downstream of said inlet end.

10. The turbine rotor as set forth in claim 7, wherein a circumferential width of said disk slot adjacent said inlet end is greater than a circumferential width downstream of said inlet end.

11. The turbine rotor as set forth in claim 7, wherein cross-sectional areas of said disk slots are scalloped between said inlet end and moving downstream toward said outlet end such that downstream locations are smaller both in a radial depth and in a circumferential width.

12. The turbine rotor as set forth in claim 7, wherein an inlet face of said disk slot is scalloped away to provide a smooth flow passage for air traveling into said disk slots.

* * * * *